(12) United States Patent
Wetherup

(10) Patent No.: US 8,011,143 B1
(45) Date of Patent: Sep. 6, 2011

(54) MANUFACTURED HOME/SAFETY SHELTER SYSTEM

(76) Inventor: Vincent Ross Wetherup, Oshawa (CA)

(*) Notice: Subject to any disclaimer, the term of this patent is extended or adjusted under 35 U.S.C. 154(b) by 0 days.

(21) Appl. No.: 12/928,169

(22) Filed: Dec. 6, 2010

(51) Int. Cl.
*E04B 1/00* (2006.01)

(52) U.S. Cl. ...................................................... 52/169.1

(58) Field of Classification Search .................. 52/169.6, 52/79.1, 169.12, 19, 20, 21, 80.1, 80.2, 81.1, 52/107, 169.1, 79.7, 167.1
See application file for complete search history.

(56) References Cited

U.S. PATENT DOCUMENTS

| | | | | |
|---|---|---|---|---|
| 4,102,088 A | * | 7/1978 | Keller et al. | 52/20 |
| 4,126,972 A | * | 11/1978 | Silen | 52/34 |
| 4,615,158 A | * | 10/1986 | Thornton | 52/169.6 |
| 5,481,837 A | * | 1/1996 | Minks, Jr. | 52/169.6 |
| 5,649,395 A | * | 7/1997 | Durham | 52/173.3 |
| 5,706,846 A | * | 1/1998 | Sutton | 135/128 |
| 6,076,313 A | * | 6/2000 | Pannell et al. | 52/169.6 |
| 6,131,343 A | * | 10/2000 | Jackson, Jr. | 52/86 |
| 6,161,345 A | * | 12/2000 | Hope et al. | 52/169.6 |
| 6,334,278 B1 | * | 1/2002 | Arnold | 52/79.1 |
| 6,343,443 B1 | * | 2/2002 | Tylicki, Jr. | 52/79.1 |
| 6,374,553 B1 | * | 4/2002 | Johnson | 52/169.6 |
| 6,539,674 B2 | * | 4/2003 | Arnold | 52/79.1 |
| 6,550,189 B2 | * | 4/2003 | Shelton | 52/167.1 |
| 6,941,709 B1 | * | 9/2005 | Stanford, Sr. | 52/169.6 |
| 7,765,746 B2 | * | 8/2010 | Reed | 52/80.1 |
| 7,861,468 B1 | * | 1/2011 | Gernstein | 52/107 |
| 2003/0051418 A1 | * | 3/2003 | Crowder | 52/80.1 |
| 2005/0160687 A1 | * | 7/2005 | Corry | 52/107 |
| 2005/0252103 A1 | * | 11/2005 | Cook | 52/107 |

* cited by examiner

*Primary Examiner* — Eileen D Lillis
*Assistant Examiner* — Andrew Triggs

(57) ABSTRACT

A slab is fabricated of concrete positionable adjacent to a side wall of a manufactured home. The slab has a periphery. The periphery forms a lower flange. A dome is positioned upon the slab. The dome has a flat face. The flat face is positionable in contact with the side wall. The flat face is formed with an opening in facing contact with the side wall. The dome has a peripheral flange remote from the opening. The peripheral flange of the dome is concentric with and smaller than the peripheral flange of the slab.

2 Claims, 2 Drawing Sheets

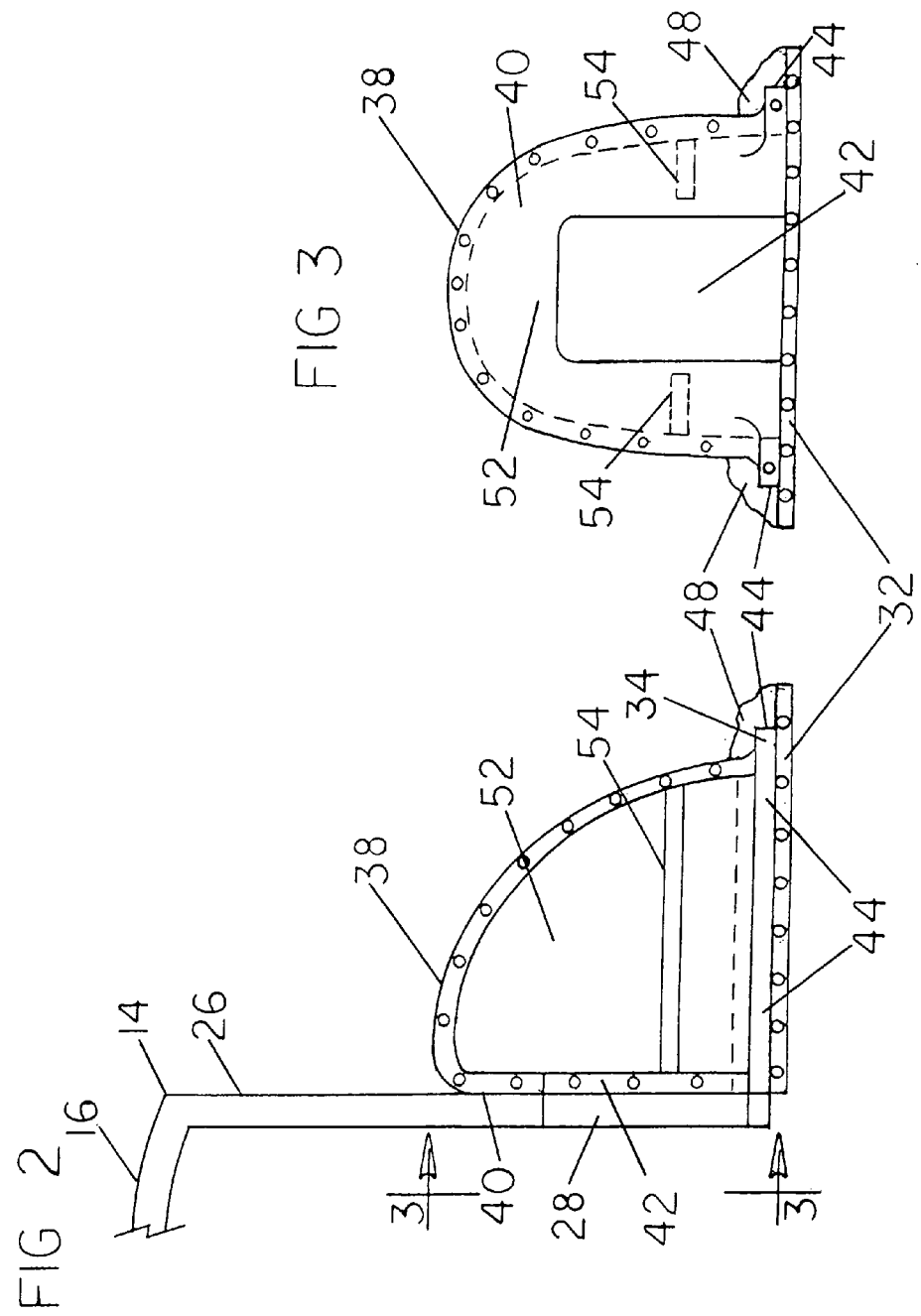

MANUFACTURED HOME/SAFETY SHELTER SYSTEM

BACKGROUND OF THE INVENTION

Field of the Invention

The present invention relates to a manufactured home/safety shelter system and more particularly pertains to providing safe refuge to manufactured home residents in the event of a tornado and other inclement weather, such providing of safe refuge being done in a safe, convenient and economical manner.

SUMMARY OF THE INVENTION

In view of the foregoing disadvantages inherent in the known types of shelter systems of known designs and configurations now present in the prior art, the present invention provides an improved manufactured home/safety shelter system. As such, the general purpose of the present invention, which will be described subsequently in greater detail, is to provide a new and improved manufactured home/safety shelter system and method which has all the advantages of the prior art and none of the disadvantages.

To attain this, the present invention essentially comprises a manufactured home/safety shelter system. First provided is a manufactured home. The manufactured home has a top. The manufactured home has a bottom. The manufactured home has a front. The manufactured home has a rear. The manufactured home has parallel first and second side walls. The side walls are provided between the front and rear and between the top and the bottom. The first side wall has a rectangular opening. The opening has a lowermost extent. The lowermost extent of the opening is essentially coextensive with the bottom. The opening has a height of 4.0 feet, plus or minus 10 percent. The opening has a width of 2.5 feet, plus or minus 10 percent.

A slab is provided. The slab is fabricated of concrete. The slab is provided at ground level. The slab extends from the opening for a width of 90 inches, plus or minus 10 percent. The slab laterally extends about a centerline perpendicularly from the first side wall for a length of 80 inches, plus or minus 10 percent. The slab has a thickness of 4 inches, plus or minus 10 percent. The periphery of the slab is provided remote from the first side wall. In this manner a lower flange is formed.

Provided next is a dome. The dome is positioned upon the slab. The dome having a flat face. The flat face is in contact with the first side wall. The flat face has a secondary opening. The secondary opening is in facing contact with the opening in the first side wall. The secondary opening in the dome has a height and a width essentially equal to the height and width of the opening in the first side wall. The dome has a maximum height of 72 inches, plus or minus 10 percent. The dome has a maximum width of 72 inches, plus or minus 10 percent. The dome has a maximum depth of 72 inches, plus or minus 10 percent. The dome has a peripheral flange. The peripheral flange is provided remote from the opening. The peripheral flange of the dome is concentric with and between 2 and 6 inches smaller than the peripheral flange of the slab. The slab is fabricated of poured concrete with a thickness of 4 inches, plus or minus 10 percent. Reinforcing bars are provided within the slab.

Further provided is a quantity of concrete. The concrete is provided over the upper flange of the slab and the lower flange of the dome. In this manner the dome is secured to the slab.

The dome forms an interior tornado-proof chamber. The chamber has a bench. The bench is located within the chamber. The bench extends from the flat wall of the dome. The bench is integrally formed of concrete with the dome.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved manufactured home/safety shelter system which has all of the advantages of the prior art shelter systems of known designs and configurations and none of the disadvantages.

It is another object of the present invention to provide a new and improved manufactured home/safety shelter system which may be easily and efficiently manufactured and marketed.

It is further object of the present invention to provide a new and improved manufactured home/safety shelter system which is of durable and reliable constructions.

An even further object of the present invention is to provide a new and improved manufactured home/safety shelter system which is susceptible of a low cost of manufacture with regard to both materials and labor, and which accordingly is then susceptible of low prices of sale to the consuming public, thereby making such manufactured home/safety shelter system economically available to the buying public.

Even still another object of the present invention is to provide a manufactured home/safety shelter system for providing safe refuge to manufactured home residents in the event of a tornado and other inclement weather, such providing of safe refuge being done in a safe, convenient and economical manner.

Lastly, it is an object of the present invention to provide a new and improved manufactured home/safety shelter system. A slab is fabricated of concrete positionable adjacent to a side wall of a manufactured home. The slab has a periphery. The periphery forms a lower flange. A dome is positioned upon the slab. The dome has a flat face. The flat face is positionable in contact with the side wall. The flat face is formed with an opening in facing contact with the side wall. The dome has a peripheral flange remote from the opening. The peripheral flange of the dome is concentric with and smaller than the peripheral flange of the slab.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a cross sectional view of the system taken along line 2-2 of FIG. 1.

FIG. 3 is a cross sectional view of the system taken along lie 3-3 of FIG. 2.

The same reference numerals refer to the same parts throughout the various Figures.

DESCRIPTION OF THE PREFERRED EMBODIMENT

Figure 1:
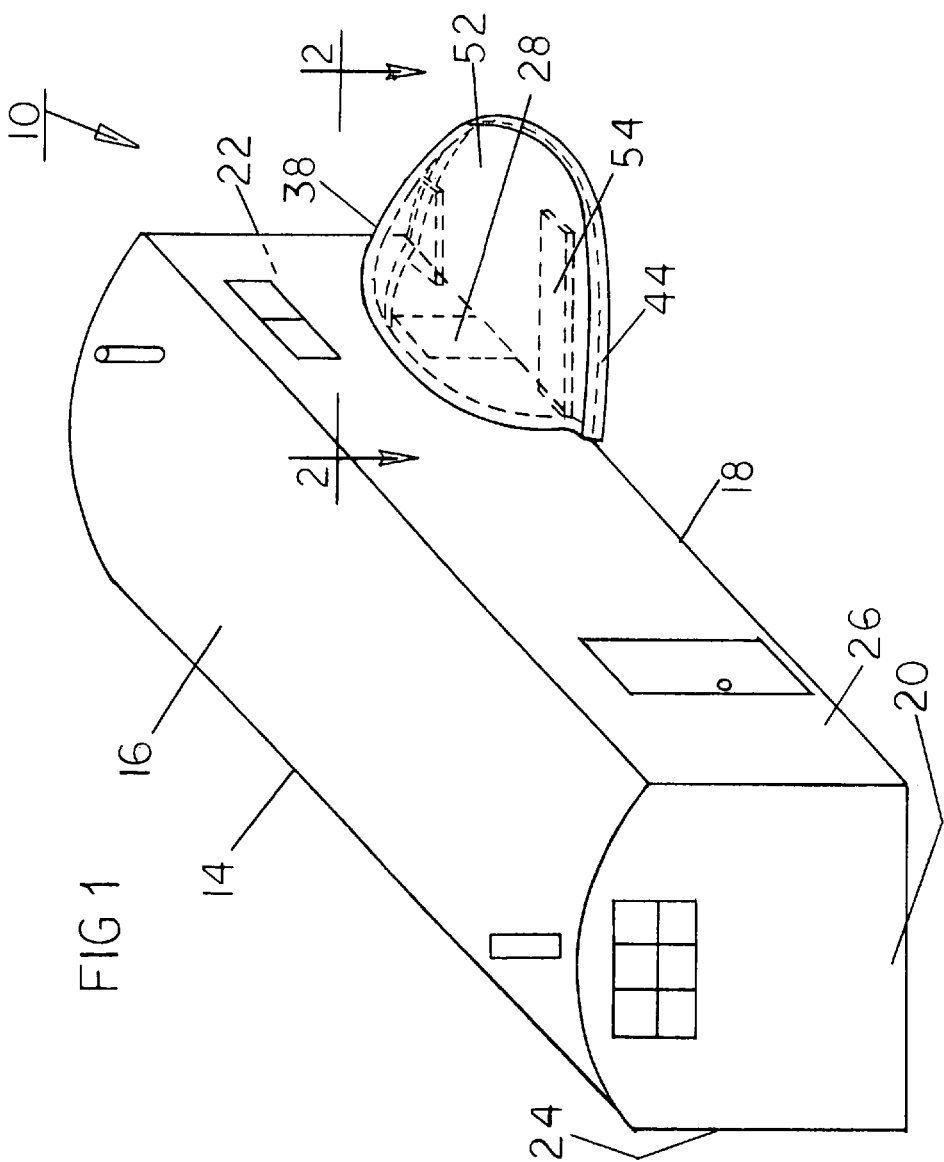
FIG. 1 is a perspective illustration of a manufactured home/safety shelter system constructed in accordance with the principles of the present invention.

With reference now to the drawings, and in particular to FIG. 1 thereof, the preferred embodiment of the new and improved manufactured home/safety shelter system embodying the principles and concepts of the present invention and generally designated by the reference numeral 10 will be described.

The present invention, the manufactured home/safety shelter system 10 is comprised of a plurality of components. Such components in their broadest context include a slab and a dome. Such components are individually configured and correlated with respect to each other so as to attain the desired objective.

First provided is a manufactured home 14. The manufactured home has a top 16. The manufactured home has a bottom 18. The manufactured home has a front 20. The manufactured home has a rear 22. The manufactured home has parallel first and second side walls 24, 26. The side walls are provided between the front and rear and between the top and the bottom. The first side wall has a rectangular opening 28. The opening has a lowermost extent. The lowermost extent of the opening is essentially coextensive with the bottom. The opening has a height of 4.0 feet, plus or minus 10 percent. The opening has a width of 2.5 feet, plus or minus 10 percent.

A slab 32 is provided. The slab is fabricated of concrete. The slab is provided at ground level. The slab extends from the opening for a width of 90 inches, plus or minus 10 percent. The slab laterally extends about a centerline perpendicularly from the first side wall for a length of 80 inches, plus or minus 10 percent. The slab has a thickness of 4 inches, plus or minus 10 percent. The periphery of the slab is provided remote from the first side wall. In this manner a lower flange 34 is formed.

Provided next is a dome 38. The dome is positioned upon the slab. The dome having a flat face 40. The flat face is in contact with the first side wall. The flat face has a secondary opening 42. The secondary opening is in facing contact with the opening in the first side wall. The secondary opening in the dome has a height and a width essentially equal to the height and width of the opening in the first side wall. The dome has a maximum height of 72 inches, plus or minus 10 percent. The dome has a maximum width of 72 inches, plus or minus 10 percent. The dome has a maximum depth of 72 inches, plus or minus 10 percent. The dome has a peripheral flange 44. The peripheral flange is provided remote from the opening. The peripheral flange of the dome is concentric with and between 2 and 6 inches smaller than the peripheral flange of the slab. The slab is fabricated of poured concrete with a thickness of 4 inches, plus or minus 10 percent. Reinforcing bars are provided within the slab.

Further provided is a quantity of concrete 48. The concrete is provided over the upper flange of the slab and the lower flange of the dome. In this manner the dome is secured to the slab.

The dome forms an interior tornado-proof chamber 52. The chamber has a bench 54. The bench is located within the chamber. The bench extends from the flat wall of the dome. The bench is integrally formed of concrete with the dome.

In an alternate embodiment of the invention, the dome is adapted to be fabricated of a wide variety rigid materials. The rigid materials include, for example, concrete and a synthetic, such as Vectran. Vectran is synthetic material made of liquid crystal polymers. Vectran is a trademark owned by Kuraray Co., ltd. a Corporation of Japan 1621, Sakazu Kurashiki City, Okayama Prefecture Japan.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A manufactured home/safety shelter system comprising:
   a manufactured home (14) having a top (16) and a bottom (18) and a front 20 and a rear 22 and parallel first an side walls (24), (26) between the front and rear and between the top and the bottom, the first side wall having a rectangular opening (28), the opening having a lowermost extent essentially coextensive with the bottom;
   a slab (32) fabricated of concrete, the slab being at ground level extending from the opening for a width, the slab laterally extending about a centerline perpendicularly from the first side wall, the slab having a thickness, the periphery of the slab remote from the first side wall forming a lower flange (34);
   a dome (38), positioned directly upon the slab, the dome having a flat face (40) in contact with the first side wall, the flat face formed with a secondary opening (42) in facing contact with the opening in the first side wall of the manufactured home, the secondary opening in the dome having a height and a width essentially equal to the height and width of the opening in the first side wall, the dome having a maximum height, the dome having a maximum width, the dome having a maximum depth, the dome having a peripheral flange (44) remote from the opening, the peripheral flange of the dome being concentric with the peripheral flange of the slab, the slab being fabricated of poured concrete with a thickness, and with reinforcing bars there within;

a quantity of concrete (48) overlying the upper flange of the slab and the lower flange of the dome for securing the dome to the slab; and the dome forming an interior tornado-proof chamber (52) with a bench (54), the bench located within the chamber and extending from the flat wall of the dome and integrally formed of concrete with the dome.

2. A manufactured home/safety shelter system (10) for providing safe refuge to manufactured home residents in the event of a tornado and other inclement weather, such providing of safe refuge being done in a safe, convenient and economical manner, the system comprising, in combination:

a manufactured home (14) having a top (16) and a bottom (18) and a front (20) and a rear (22) and parallel first and second side walls (24), (26) between the front and rear and between the top and the bottom, the first side wall having a rectangular opening (28), the opening having a lowermost extent essentially coextensive with the bottom, the opening having a height of 4.0 feet, plus or minus 10 percent, and a width of 2.5 feet, plus or minus 10 percent;

a slab (32) fabricated of concrete, the slab being at ground level extending from the opening for a width of 90 inches, plus or minus 10 percent, the slab laterally extending about a centerline perpendicularly from the first side wall for a length of 80 inches, plus or minus 10 percent, the slab having a thickness of 4 inches, plus or minus 10 percent, the periphery of the slab remote from the first side wall forming a lower flange (34);

a dome (38) positioned directly upon the slab, the dome having a flat face (40) in contact with the first side wall, the flat face formed with a secondary opening (42) in facing contact with the opening in the first side wall of the manufactured home, the secondary opening in the dome having a height and a width essentially equal to the height and width of the opening in the first side wall, the dome having a maximum height of 72 inches, plus or minus 10 percent, the dome having a maximum width of 72 inches, plus or minus 10 percent, the dome having a maximum depth of 72 inches, plus or minus 10 percent, the dome having a peripheral flange (44) remote from the opening, the peripheral flange of the dome being concentric with and between 2 and 6 inches smaller than the peripheral flange of the slab, the slab being fabricated of poured concrete with a thickness of 4 inches, plus or minus 10 percent, and with reinforcing bars there within;

a quantity of concrete (48) overlying the upper flange of the slab and the lower flange of the dome for securing the dome to the slab; and the dome forming an interior tornado-proof chamber (52) with a bench (54), the bench located within the chamber and extending from the flat wall of the dome and integrally formed of concrete with the dome.

\* \* \* \* \*